United States Patent
Jaaskelainen et al.

(10) Patent No.: US 10,465,482 B2
(45) Date of Patent: Nov. 5, 2019

(54) INDUCTIVE CHARGING FOR ELECTRO ACOUSTIC TECHNOLOGY

(71) Applicant: Halliburton Energy Services, Inc., Houston, TX (US)

(72) Inventors: Mikko Jaaskelainen, Katy, TX (US); Brian V. Park, Spring, TX (US); Seldon David Benjamin, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/765,199

(22) PCT Filed: Dec. 16, 2015

(86) PCT No.: PCT/US2015/065953
§ 371 (c)(1),
(2) Date: Mar. 30, 2018

(87) PCT Pub. No.: WO2017/105422
PCT Pub. Date: Jun. 22, 2017

(65) Prior Publication Data
US 2018/0283143 A1    Oct. 4, 2018

(51) Int. Cl.
| | | |
|---|---|---|
| H02J 7/00 | (2006.01) | |
| E21B 41/00 | (2006.01) | |
| H02J 50/10 | (2016.01) | |
| E21B 47/12 | (2012.01) | |
| G01D 5/353 | (2006.01) | |
| H02J 7/02 | (2016.01) | |

(52) U.S. Cl.
CPC ........ *E21B 41/0085* (2013.01); *E21B 47/123* (2013.01); *G01D 5/353* (2013.01); *H02J 7/025* (2013.01); *H02J 50/10* (2016.02)

(58) Field of Classification Search
CPC ................................................... E21B 41/0085
USPC ........................................................ 320/108
See application file for complete search history.

(56) References Cited

U.S. PATENT DOCUMENTS

| | | | | |
|---|---|---|---|---|
| 8,829,905 | B2* | 9/2014 | Davila | G01R 33/36 324/322 |
| 9,206,672 | B2* | 12/2015 | Cooley | E21B 41/0085 |
| 9,631,484 | B2* | 4/2017 | Rozenblit | E21B 47/122 |
| 9,739,120 | B2* | 8/2017 | Murphree | E21B 34/066 |
| 2007/0182367 | A1* | 8/2007 | Partovi | H01F 5/003 320/108 |
| 2009/0174361 | A1 | 7/2009 | Duron et al. | |
| 2013/0026978 | A1* | 1/2013 | Cooley | H01M 10/052 320/107 |

OTHER PUBLICATIONS

PCT Application Serial No. PCT/US2015/065953, International Search Report, dated Sep. 12, 2016, 4 pages.
PCT Application Serial No. PCT/US2015/065953, International Written Opinion, dated Sep. 12, 2016, 6 pages.

* cited by examiner

*Primary Examiner* — Yalkew Fantu
(74) *Attorney, Agent, or Firm* — Gilliam IP PLLC

(57) ABSTRACT

A system and method for enabling inductive charging through downhole casings for electro acoustic technology devices.

18 Claims, 5 Drawing Sheets

INDUCTIVE CHARGING FOR ELECTRO ACOUSTIC TECHNOLOGY

BACKGROUND

This disclosure relates generally to systems and methods for enabling inductive charging through downhole casing for Electro acoustic Technology devices.

Fiber optic distributed sensing systems were developed in the 1980s to replace older measurement systems composed of multiple individual sensors.

Fiber optic distributed sensing systems are commonly based on Optical Time-Domain Reflectometry (OTDR) and utilizes techniques originally derived from telecommunications cable testing. Today fiber optic distributed sensing systems provides a cost-effective way of obtaining hundreds, or even thousands, of highly accurate, high-resolution measurements and today find widespread acceptance in industries such as oil and gas, electrical power, and process control.

Electro acoustic technology EAT devices represent a new technology that is described later in this disclosure.

EAT devices may be coupled to a DAS fiber or any other appropriate fiber optic sensing system mounted on the outside of a production casing string. They are either powered by battery or energy harvesting devices or both. However there may be cases where the batteries cannot be charged by energy harvesting—the flow does not create sufficient turbulence for vortex energy harvesting for example. In this case the EAT useful lifespan is limited to the charge in the battery and once depleted, has no further use. It cannot be retrieved to change out the batteries given that it may be located outside of the tubing and/or casing.

Developments in inductive charging for downhole, has enabled electronic devices to be charged through the casing. This method can be used to charge the sensor behind the casing and also to interrogate the data and bring it back to the surface by wireline.

This approach requires a wireline unit and therefore the data is historical and not real time.

There is a need therefore for means to routinely charge the EAT devices so that they supply their data to the surface continuously in real time.

The systems and methods described herein address this need.

DETAILED DESCRIPTION

In the following detailed description, reference is made to accompanying drawings that illustrate embodiments of the present disclosure. These embodiments are described in sufficient detail to enable a person of ordinary skill in the art to practice the disclosure without undue experimentation. It should be understood, however, that the embodiments and examples described herein are given by way of illustration only, and not by way of limitation. Various substitutions, modifications, additions, and rearrangements may be made without departing from the spirit of the present disclosure. Therefore, the description that follows is not to be taken in a limited sense, and the scope of the present disclosure will be defined only by the final claims.

EAT is able to provide the same data continuously in real time by transmitting through a fiber optic sensing system like e.g. a DAS fiber to the surface where the fiber is interrogated. The disclosure described herein combines inductive charging technology through a casing wall with either pump down EATs which act as untethered charging modules, or with wireline propelled charging modules. The pump down modules can be pumped down as required to any location, charge the batteries via induction, and be returned to the surface by reversing the flow direction. Multiple EATs can be recharged in a single flow cycle. The pump down EAT battery chargers may also transfer data to the EAT to command the EAT to perform some task, or update programs, or retrieve data from the EAT that would not normally be transmitted by DAS, such as diagnostic information of the state of the electronics or battery.

The wireline based charging modules operate in a similar fashion but use wirelines as the propelling mechanism.

Description of EAT (Electro Acoustic Technology) Sensors

The EAT sensors and EAT sensing technology described in this disclosure is a recently developed technology and has been described in a recently published PCT application: WO2015020642A1.

EAT Sensors represent a new approach to fiber optic sensing in which any number of downhole sensors, electronic or fiber optic based, can be utilized to make the basic parameter measurements, but all of the resulting information is converted at the measurement location into perturbations or a strain applied to an optical fiber that is connected to an interrogator that may be located at the surface of a downhole well. The interrogator may routinely fire optical signal pulses downhole into the optical fiber. As the pulses travel down the optical fiber back scattered light is generated and is received by the interrogator.

The perturbations or strains introduced to the optical fiber at the location of the various EAT sensors can alter the back propagation of light and those effected light propagations can then provide data with respect to the signal that generated the perturbations.

Figure 1:
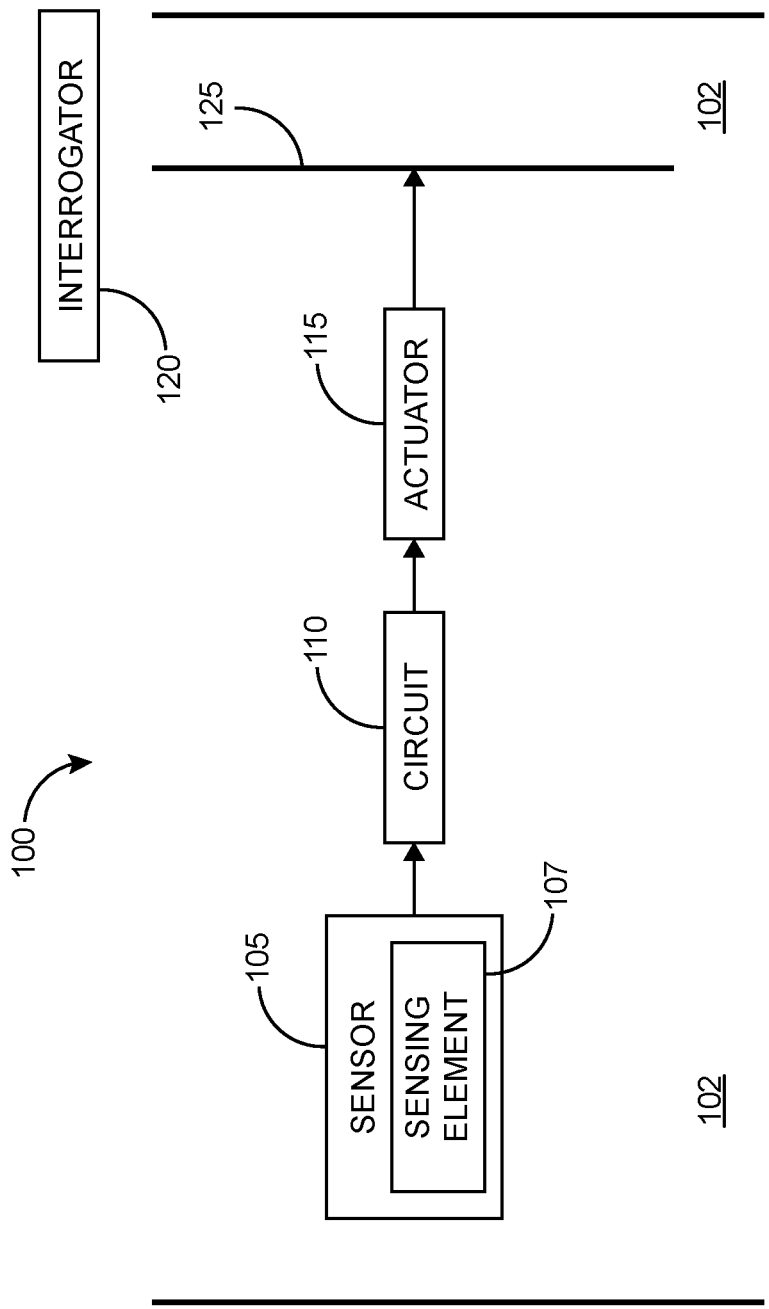
FIG. 1 illustrates the electro acoustic technology (EAT) concept for parameter monitoring.

The EAT sensor system can be best understood by reference to FIG. 1, which is an example embodiment of an EAT sensor system. System 100 can include a sensor 105, a circuit 110 coupled to the sensor 105, an actuator 115 coupled to the circuit 110, and an interrogator 120. The sensor 105 is operable to provide a measurement corresponding to a parameter at a location in a region 102. The sensor 105 can be realized in a number of different ways depending on the parameter to be determined by the measurement using the sensor 105. The parameter can include, but is not limited to, a chemical concentration, a pH, a temperature, a vibration, or a pressure. The sensor 105 has the capability of being disposed at a location in proximity of an optical fiber cable 125. The sensor 105 can be located downhole at a drilling site with the interrogator 120 at the surface of the drilling site. The drilling site may be terrestrial or sea-based. Components of the system 100 may be disposed outside casing in cement or strapped to a production tube in a permanent installation. Components of the system 100 also may be disposed in a coiled tube that can be pushed through into a horizontal area of operation, or a wire line cable that can be tractored into a wellbore using an electrically driven tractor that pulls the wire line cable into the wellbore, or pumped into a wellbore with fluid that push/pulls a cable into the wellbore. The system 100 may be used with other drilling related arrangements. The circuit 110, coupled to the sensor 105, can be structured to be operable to generate a signal correlated to the parameter in response to the measurement by the sensor 105. The circuit 110 may be integrated with the sensor 105. For example, a sensing element 107 may be an integral part of the circuit 110 or directly coupled to a component of the circuit 110. The sensing element 107 may be a diaphragm directly coupled to a component of the circuit 110.

The actuator 115 can be coupled to the circuit 110 to receive the signal generated in response to the measurement by the sensor 105. The signal can be a compensated signal, where a compensated signal is a signal having a characteristic that corresponds to the parameter of interest for which variations in one or more other parameters is substantially corrected or removed, or for which the characteristic is isolated to the parameter of interest. The actuator 115 can be integrated with the circuit 110, integrated with the circuit 110 that is integrated with the sensor 105, or a separate structure coupled to the circuit 110.

The actuator 115 can be structured to be operable to generate a perturbation, based on the signal, to an optical fiber cable 125, that may include one or multiple optical fibers. The actuator 115 can be positioned in proximity to the optical fiber cable 125 at the effective location of the sensor 105. The actuator 115 can be structured to be operable to generate the perturbation to the optical fiber cable 125 with the actuator 115 in contact with the optical fiber cable 125. The actuator 115 can be structured to be operable to generate the perturbation to the optical fiber cable 125 with the actuator 115 a distance from the optical fiber cable 125. The actuator 115 may be realized as a non-contact piezoelectric material, which can provide acoustic pressure to the optical fiber cable 125 rather than transferring vibrations by direct contact.

The optical fiber cable 125 can be perturbed with the optical fiber cable 125 in direct contact with the actuator 115 structured as a vibrator or with the actuator 115 structured having a form of voice coil at a distance away from the optical fiber cable 125. The perturbation of the optical fiber can be provided as a vibration of the optical fiber cable 125 or a strain induced into the optical fiber cable 125. Other perturbations may be applied such that the characteristics of the optical fiber are altered sufficiently to affect propagation of light in the optical fiber cable 125. With the effects on the light propagation related to a signal that generates the perturbation, analysis of the effected light propagation can provide data with respect to the signal that generates the perturbation.

The interrogator 120 can be structured to interrogate the optical fiber cable 125 to analyze signals propagating in the optical fiber cable 125. The interrogator 120 can have the capability to couple to the optical fiber cable 125 to receive an optical signal including the effects from the perturbation of the optical fiber cable 125 and to extract a value of the parameter of the measurement in response to receiving the optical signal from the perturbation. In an embodiment, the received signal may be a backscattered optical signal. The interrogator 120 may be structured, for example, to inject a short pulse into the optical fiber cable 125. An example of a short pulse can include a pulse of 20 nanoseconds long. As the pulse travels down the optical fiber cable 125, backscattered light is generated. Interrogating a location that is one kilometer down the fiber, backscattered light is received after the amount of time it takes to travel one kilometer and then come back one kilometer, which is a round trip time of about ten nanoseconds per meter. The interrogator 120 can include an interferometric arrangement. The interrogator 120 can be structured to measure frequency based on coherent Rayleigh scattering using interferometry, to measure dynamic changes in attenuation, to measure a dynamic shift of Brillouin frequency, or combinations thereof.

The interrogator 120 can be arranged with the optical fiber cable 125 to use an optical signal provided to the interrogator 120 from perturbing the optical fiber cable 125 at a location along the optical fiber cable 125. An arrangement different from using an optical signal backscattered from the perturbation can be utilized. For example, the optical fiber cable 125 can be structured having an arrangement selected from a fiber Bragg grating disposed in the optical fiber in vicinity of the actuator for direct wavelength detection based acoustic sensing, a non-wavelength selective in-line mirror disposed in the optical fiber in vicinity of the actuator, intrinsic Fabry-Perot interferometers as a mode of interrogation from fiber Bragg gratings placed apart in the optical fiber such that each fiber Bragg grating Fabry-Perot cavity is in vicinity of a respective actuator, Fizeau sensors in the optical fiber, a second optical fiber to transmit an optical signal from a perturbation of the optical fiber to a detection unit of the interrogator, or other arrangements to propagate a signal, representative of a measurement, in an optical fiber to an interrogation unit to analyze the signal to extract a value of a parameter that is the subject of the measurement.

The possible advantages from using the above described EAT systems in a variety of configurations may include using a variety of sensors, either electrical or fiber optic based, to measure for example a chemical concentration, a pH, a temperature, or a pressure and using a common optical fiber connected to a surface interrogator to measure perturbation signals from each EAT sensor location distributed along that common optical fiber and analyzing those signals to extract values of the parameters being measured. The approach can significantly reduce manufacturing complexity, reduce very expensive labor intensive production with expensive equipment like splicers and fiber winders, improve reliability, and widen industry acceptance by allowing the use of sensing technologies of choice.

Figure 2:
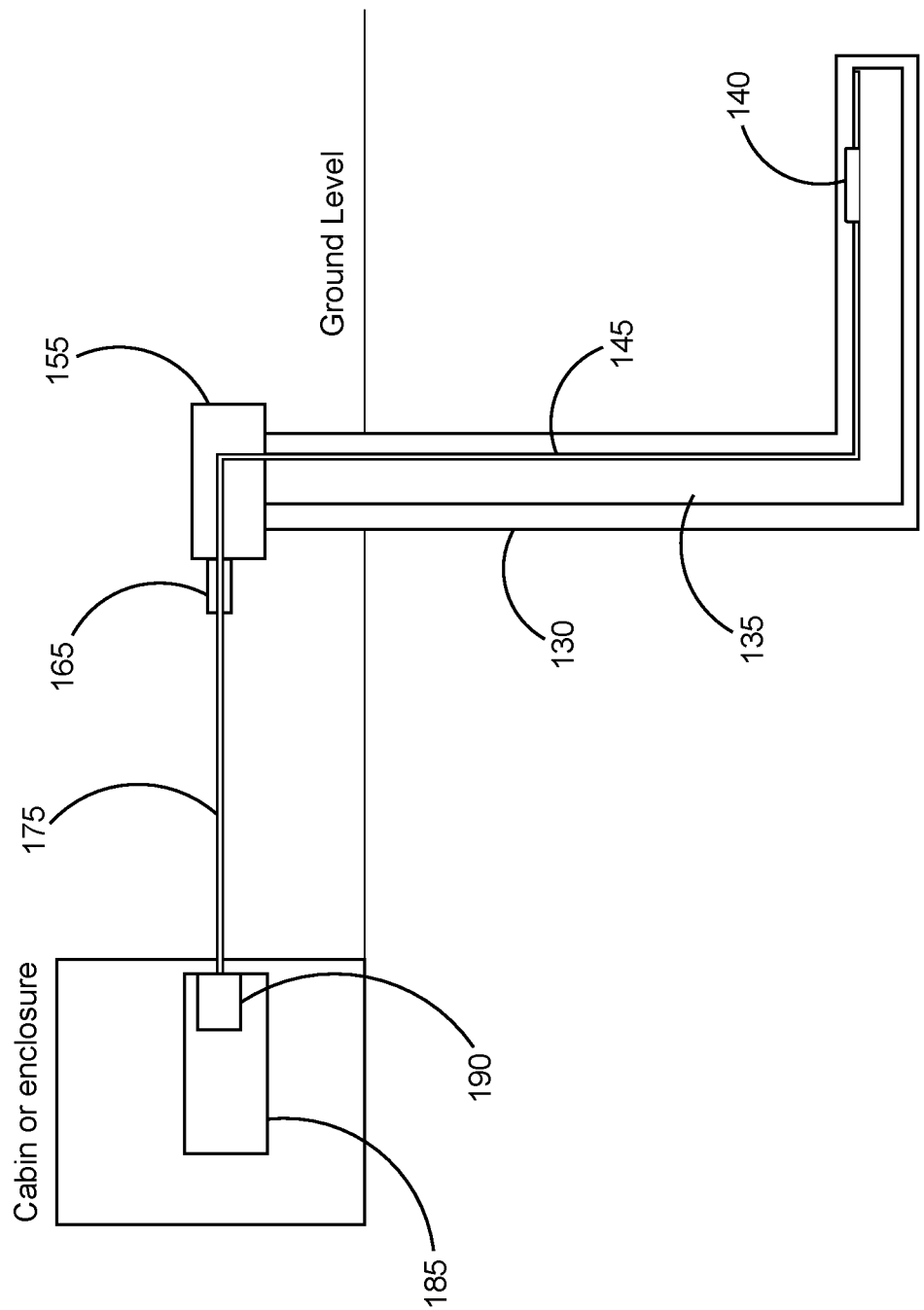
FIG. 2 illustrates a more complete system for utilizing electro acoustic technology in a subsurface well.

FIG. 2 expands on the use of electro acoustic technology (EAT) sensing systems by illustrating a more complete system. A subsurface well 130 is illustrated, in which a production casing 135 is shown extending through the well. In some applications the production casing may be non-metallic. At the far downhole end of the well an electro acoustic technology sensor assembly 140 is shown. In this example it is shown on the outside of the casing. In some applications the EAT sensor assembly could be within the casing. In many applications there could be multiple EAT sensor assemblies and the technology can easily accommodate that. In close proximity to the EAT sensor assembly shown is a fiber optic cable 145 that is deployed all through the well and back to the surface, then through a wellhead 155. The fiber optic cable 145 may be clamped to the EAT sensor assembly 140 to ensure good transmission of signals. The fiber optic cable 145 exits through a wellhead exit 165 and is connected using a surface fiber cable 175 within an outdoor cabin or enclosure to a Distributed Acoustic System (DAS) interrogator 185. The interrogator may then have a laser source 190 that fires interrogation pulses down through the fiber optic cable and receives backscattered light back from the fiber optic cable.

The fiber optic cable 145 may be permanently installed, or in some applications could be attached to some type of logging cable such as wireline or slickline cables. It could also be clamped on tubing inside the casing 135 in some applications.

Coupling of Induction Charging with Electro Acoustic Technology

Figure 3:
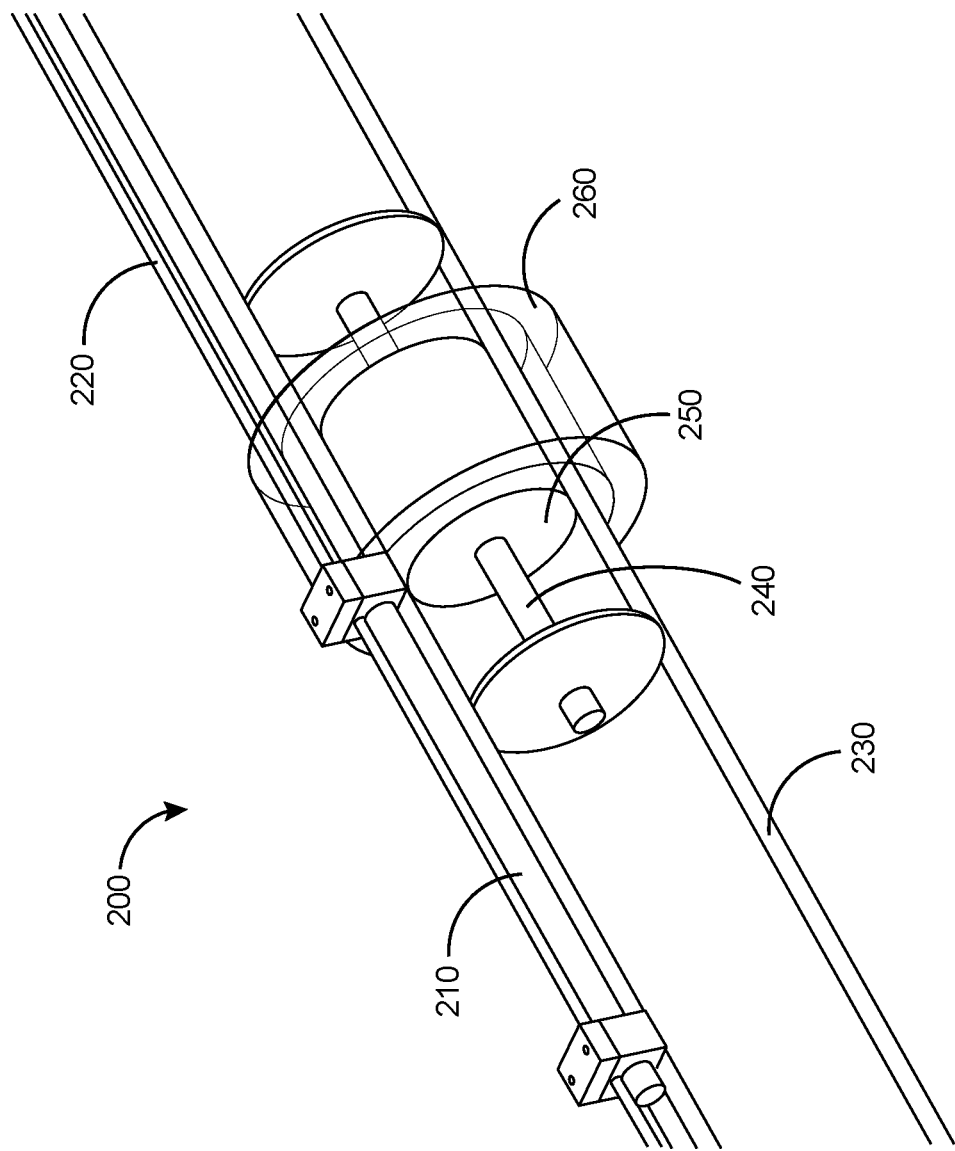
FIG. 3 illustrates a pump down inductive charger and interrogator.

FIG. 3, represented in the numeral 200, is an illustration of an EAT pump down charger interrogator. An electro acoustic technology assembly 210, with an enclosed rechargeable battery is mounted on the outside of a non-magnetic casing 230 and is in close proximity or clamped to a fiber optic cable 220 that is in communication back to the surface to a DAS interrogator system (not shown). A casing induction coil 260, installed with each EAT assembly, encircles the casing. The pump down charger interrogator comprises a pump down induction coil 250 and an electro acoustic technology pump down charger/interrogator 240. In this use the casing 230 should be non-magnetic.

The charger/interrogator, in addition to performing a charging function, can be used to transfer data to the EAT assemblies or to retrieve data from the EAT assemblies.

In use the pump down modules can be pumped down as required to any location, charge the batteries via induction, and be returned to the surface by reversing the flow direction. The pump down module could also be used to power an EAT assembly directly. Multiple EATs can be recharged in a single flow cycle. The pump down EAT battery chargers may also transfer data to the EAT to command the EAT to perform some task, or update programs, or retrieve data from the EAT that would not normally be transmitted by DAS, such as diagnostic information of the state of the electronics or battery.

The location of the pump-down charge module or later described wireline conveyed induction coil or a coned tubing conveyed induction coil (not shown) may be monitored using a DAS system as the induction coil head will make contact with the inner diameter of the casing or tubing creating acoustic signatures and/or vibration. This can then be used to coarsely align the induction coil with the EAT device that needs to be charged. Fine alignment may be done by monitoring e.g. a signal transmitted by the EAT once it detects power being fed into the receiving coil on the EAT. This signal could indicate power coupling strength and the induction coil assembly could be moved until a satisfactory charge rate has been achieved. Multiple induction coils may be placed in closed proximity along the length of the induction coil assembly and the system may control which induction coil should be activated to maximize power conversion and to reduce the need to move the induction coil assembly.

Figure 4:
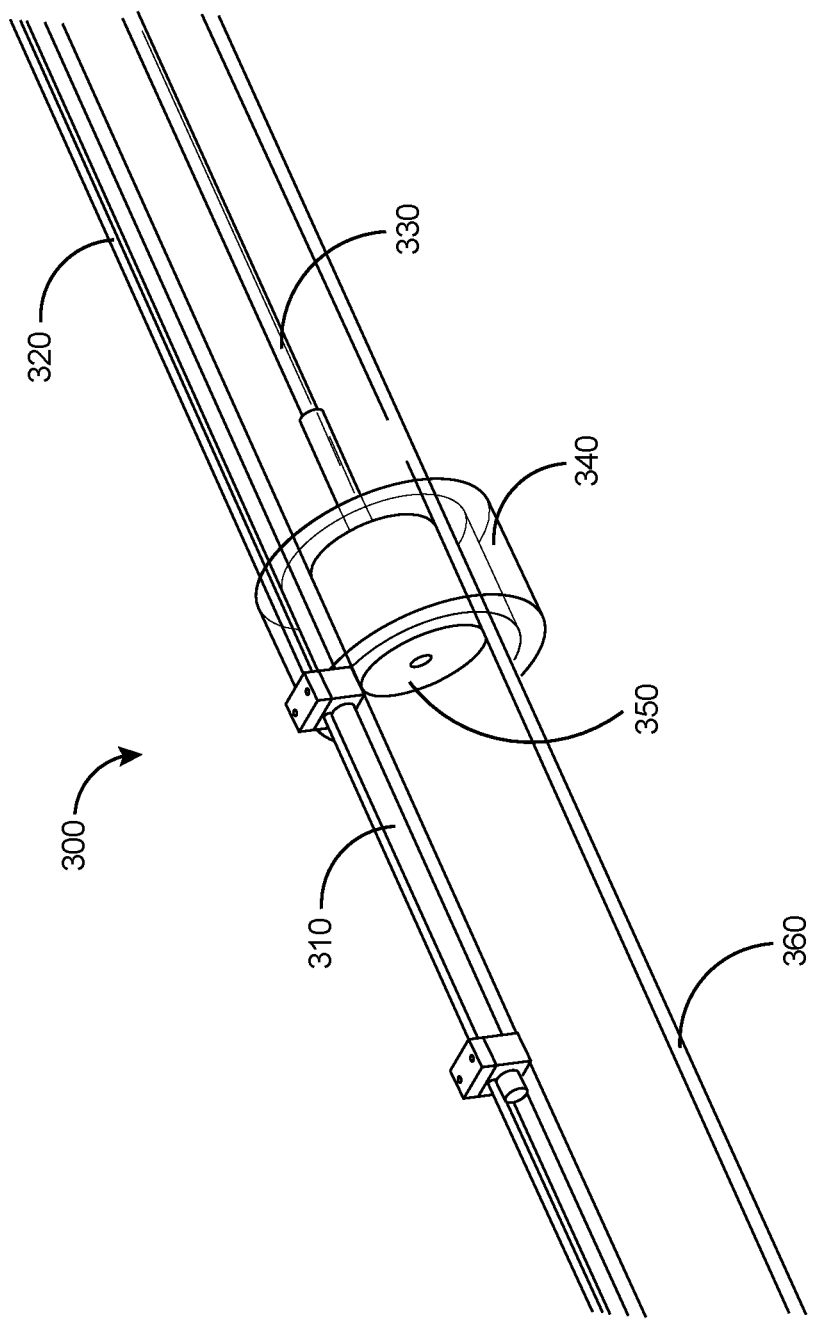
FIG. 4 illustrates one embodiment of a wireline inductive charger.

FIG. 4, represented by the numeral 300, illustrates a wireline version of an inductive charger. Again an EAT assembly 310, with an enclosed rechargeable battery, is mounted on the outside of a non-magnetic casing 360 and is clamped also to a fiber optic cable 320 that is in communication back to the surface to a DAS interrogator system (not shown). A casing induction coil 340, is also installed on the outside of the casing. A wireline charger/interrogator 350 is indicated. The wireline is indicated as 330. Again, the location of the wireline conveyed induction coil may be monitored using a DAS system as the induction coil head will make contact with the inner diameter of the casing or tubing creating acoustic signatures and/or vibration. This can then be used to coarsely align the induction coil with the EAT device that needs to be charged. Fine alignment may be done by monitoring e.g. a signal transmitted by the EAT once it detects power being fed into the receiving coil on the EAT. This signal could indicate power coupling strength and the induction coil assembly could be moved by the wireline until a satisfactory charge rate has been achieved. Multiple induction coils may be placed in closed proximity along the length of the induction coil assembly and the system may control which induction coil should be activated to maximize power conversion and to reduce the need to move the induction coil assembly.

Figure 5:
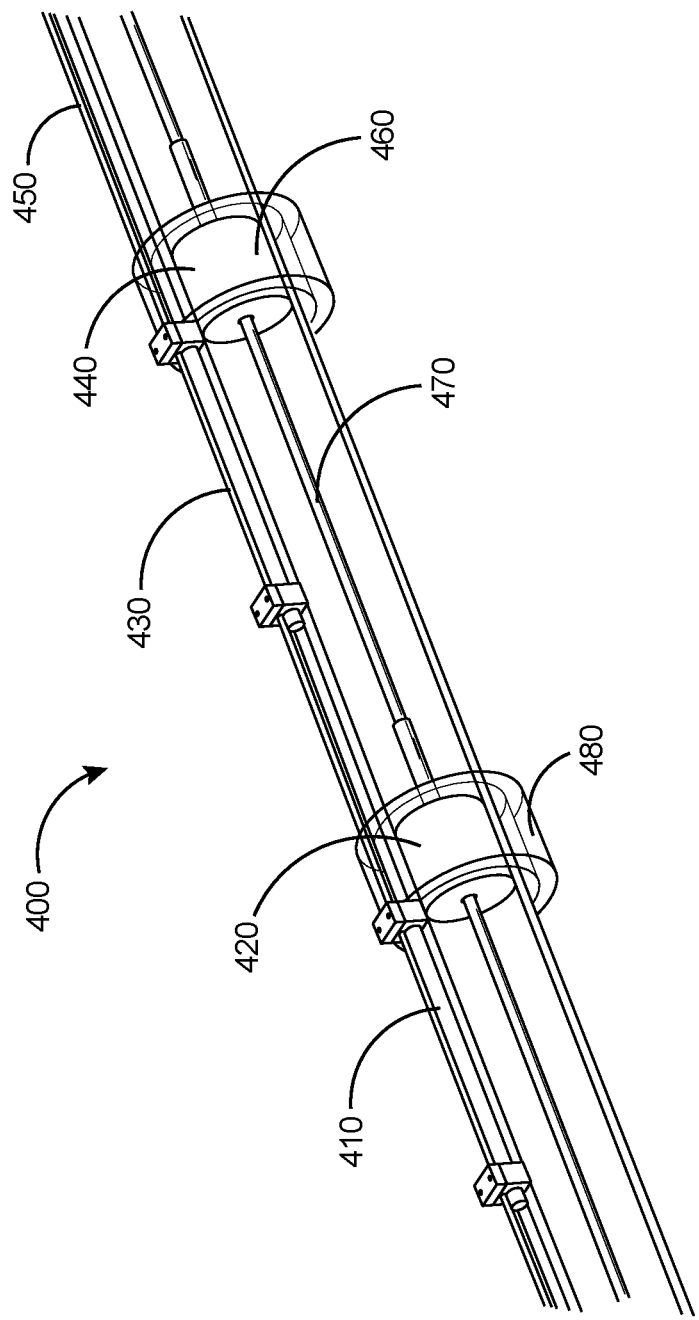
FIG. 5 illustrates a wireline alternate with multiple induction coil assemblies.

FIG. 5, represented by the numeral 400, illustrates a multiple induction charging of the type discussed in FIG. 3. Multiple EAT assemblies 410, 430 with enclosed rechargeable batteries are mounted on the outside of a non-magnetic casing and are clamped also to the fiber optic cable 450 that is in communication back to the surface to a DAS interrogator system (not shown). The wireline 470 controls the movement of two wireline charger/interrogators 420, 440 and two casing induction coils 460, 480 encircle the casing. Multiple induction coils may be placed in closed proximity along the length of the induction coil assembly and the system may control which induction coil should be activated to maximize power conversion and to reduce the need to move the induction coil assembly.

Multiple induction coil assemblies may be spaced along the wireline, and the spacing between the induction coil assemblies may be aligned with the EAT induction coils. Deployment of multiple induction coils may require the use of a wire-line settable packer depending on the length between the induction coil assemblies.

Similarly, the EAT devices designed to be re-charged using the teachings herein may include a number of induction coils to maximize the harvesting of the power transmitted by the inductive charging module.

The induction coil assembly may also contain sensors for monitoring temperature, pressure, flow and others sensors commonly used in the oil & gas industry.

Although certain embodiments and their advantages have been described herein in detail, it should be understood that various changes, substitutions and alterations could be made without departing from the coverage as defined by the appended claims. Moreover, the potential applications of the disclosed techniques is not intended to be limited to the particular embodiments of the processes, machines, manufactures, means, methods and steps described herein. As a person of ordinary skill in the art will readily appreciate from this disclosure, other processes, machines, manufactures, means, methods, or steps, presently existing or later to be developed that perform substantially the same function or achieve substantially the same result as the corresponding embodiments described herein may be utilized. Accordingly, the appended claims are intended to include within their scope such processes, machines, manufactures, means, methods or steps.

The invention claimed is:

1. A system for enabling inductive charging through downhole casings for electro acoustic technology devices comprising:
   a. one or more electro acoustic technology assemblies with enclosed rechargeable batteries attached to the outside of non-magnetic downhole casings;
   b. a casing induction coil attached to the outside of the downhole casing at each electro acoustic technology assembly location;
   c. a fiber optic cable in close proximity to the electro acoustic technology assemblies and in communication with a surface distributed acoustic fiber optic interrogator; and d. a pump down electro acoustic technology charging assembly comprising:
  i. a pump down charger interrogator and;
  ii. a pump down induction coil.

2. The system of claim 1 wherein the pump down electro acoustic technology charging assembly is used to charge the rechargeable batteries of the one or more electro acoustic technology assemblies.

3. The system of claim 1 wherein the pump down electro acoustic technology charging assembly is used to power the one or more electro acoustic technology assemblies.

4. The system of claim 2 wherein the pump down electro acoustic technology charging assembly is further used to transmit to or receive data from to the one or more electro acoustic technology assemblies.

5. A system for enabling inductive charging through downhole casings for electro acoustic technology devices comprising:
  a. one or more electro acoustic technology assemblies with enclosed rechargeable batteries attached to the outside of non-magnetic downhole casings;
  b. casing induction coils attached to the outside of the downhole casing at each electro acoustic technology assembly location;
  c. a fiber optic cable in close proximity to the electro acoustic technology assemblies and in communication with a surface distributed acoustic fiber optic interrogator;
  d. a wireline electro acoustic technology charging assembly comprising:
    iii. a wireline;
    iv. one or more a wireline charger interrogators; and
    v. one or more wireline induction coils.

6. The system of claim 5 wherein the wireline electro acoustic technology charging assembly is used to charge the rechargeable batteries of the one or more electro acoustic technology assemblies.

7. The system of claim 5 wherein the wireline electro acoustic technology charging assembly is used to power the one or more electro acoustic technology assemblies.

8. The system of claim 5 wherein the wireline electro acoustic technology charging assembly is further used to transmit to or receive data from to the electro acoustic technology assemblies.

9. A method for enabling inductive charging through downhole casings for electro acoustic technology devices comprising:

a. providing one or more electro acoustic technology assemblies with enclosed rechargeable batteries attached to the outside of non-magnetic downhole casings;
b. providing casing induction coils attached to the outside of the downhole casing at each electro acoustic technology assembly location;
c. providing a fiber optic cable in close proximity to the electro acoustic technology assemblies and in communication with a surface distributed acoustic fiber optic interrogator; and
d. providing an acoustic technology charging assembly in the casing.

10. The method of claim 9 further providing inductive charging to the batteries of the one or more electro acoustic technology devices by pumping the pump down electro acoustic technology charging assembly to the location of any of the electro acoustic technology devices requiring charging.

11. The method of claim 10 further providing power to power the one or more electro acoustic technology assemblies.

12. The method of claim 10 further is providing data transfer between electro acoustic charging assembly and the electro acoustic technology assemblies.

13. The method of claim 10, wherein the acoustic technology charging assembly comprises a wireline electro acoustic technology charging assembly.

14. The method of claim 10 further providing inductive charging to the batteries of the one or more electro acoustic technology assemblies via the wireline electro acoustic technology charging assembly.

15. The method of claim 9 further providing power to power the one or more electro acoustic technology assemblies via the wireline electro acoustic technology charging assembly.

16. The method of claim 15 further is providing data transfer between the wireline electro acoustic charging assembly and the one or more electro acoustic technology assemblies.

17. The method of claim 15, wherein the acoustic technology charging assembly comprises a pump down electro acoustic technology charging assembly.

18. The method of claim 15, wherein the wireline electro acoustic technology charging assembly comprises a wireline, a wireline charger interrogator, and a wireline induction coil.

* * * * *